Patented Nov. 27, 1934

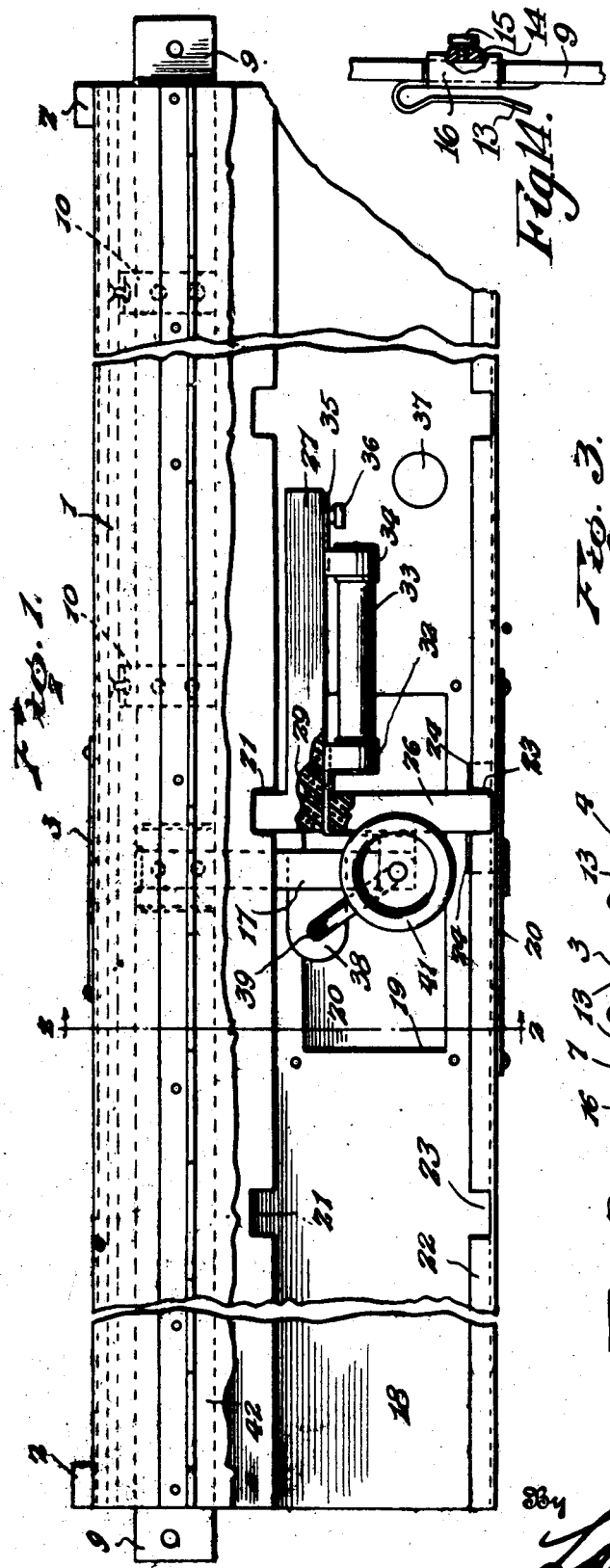

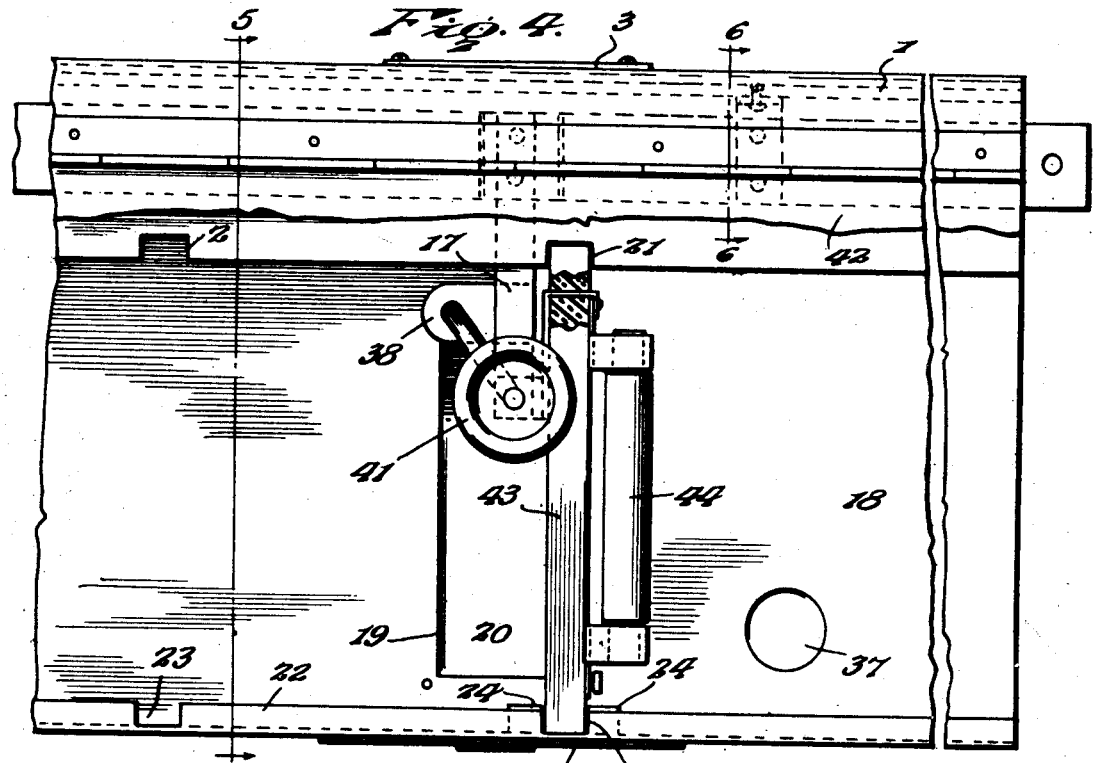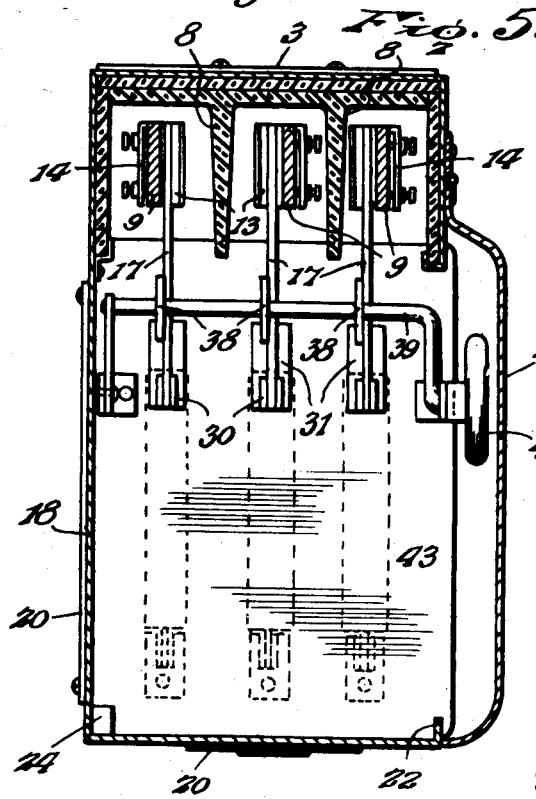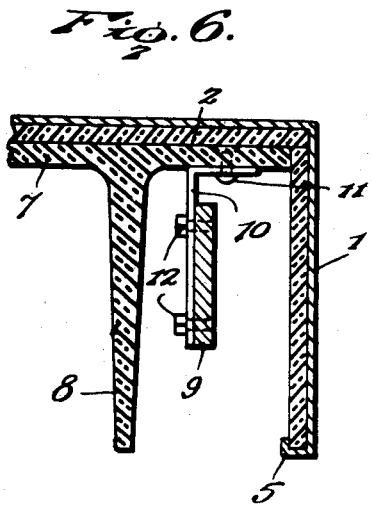

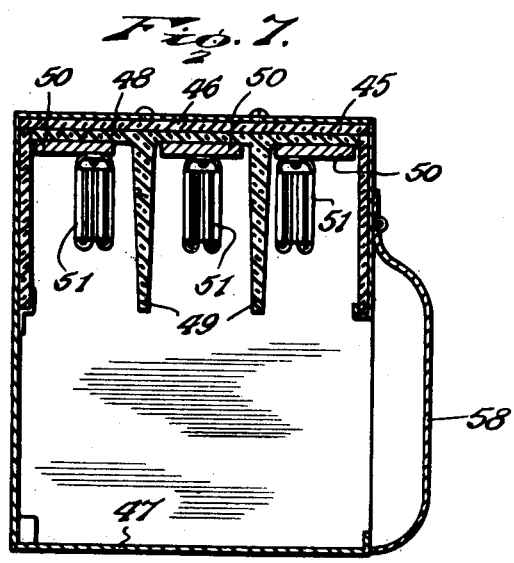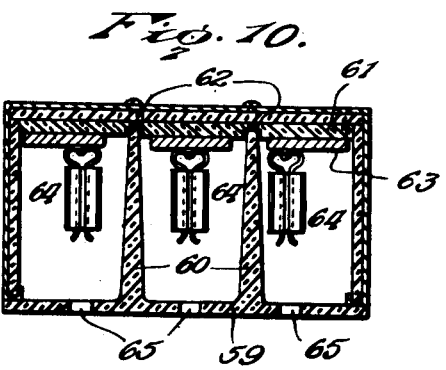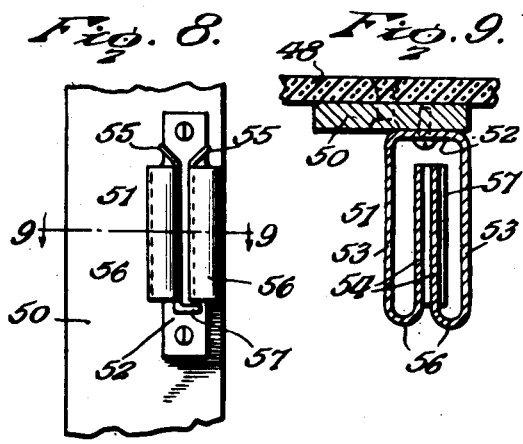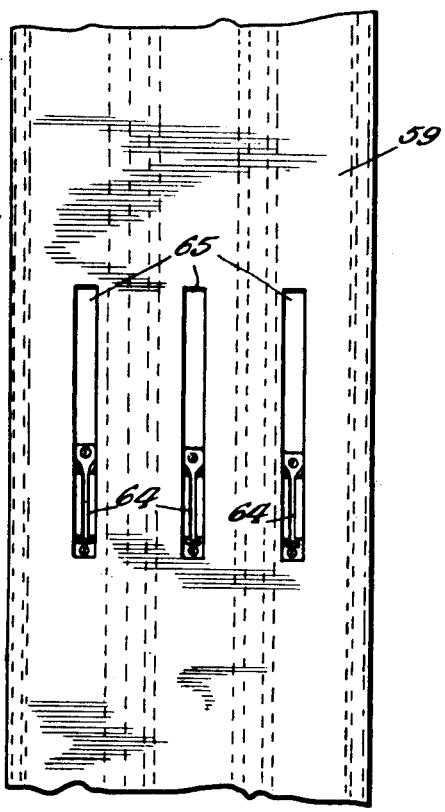

1,982,152

UNITED STATES PATENT OFFICE 1,982,152

SYSTEM FOR DISTRIBUTING POWER

Martin J. De Mask, Pittsfield, Mass.

Application July 2, 1932, Serial No. 620,707

4 Claims. (Cl. 247—3)

This invention relates to means for distributing high voltage electrical power and has special reference to those systems in which conducting bars or bus bars extend longitudinally through conduits and are separated by barriers of insulation which also extend longitudinally of the conduit parallel with the bus bars. At intervals in such systems, means are provided for connecting branch conductors to convey current to points of use and the present invention has for its object the improvement of the construction of such conduits and parts assembled therewith whereby the conducting elements may be easily assembled with the conduit and good electrical contacts may be always made without liability of short circuits and without endangering the operators. The invention is disclosed in the accompanying drawings and will be hereinafter fully described, the novel features being particularly defined in the appended claims.

In the drawings, Figure 1 is a side elevation, partly broken away and in section, of a portion of a conduit and a switch casing connected therewith, the door or side cover of the switch casing being broken away, Fig. 2 is a transverse section on the line 2—2 of Fig. 1, Fig. 3 is a detail perspective view of the base block upon which the switch mechanism and blowout fuses are mounted, Fig. 4 is a view similar to Fig. 1 showing a slight modification of the switch mechanism, Fig. 5 is a transverse section on the line 5—5 of Fig. 4, Fig. 6 is an enlarged detail section on the line 6—6 of Fig. 4, Fig. 7 is a transverse section showing an arrangement of the bus bars different from that shown in the preceding figures, Fig. 8 is an enlarged bottom plan view of the contact clip shown in Fig. 7, Fig. 9 is a detail section on the line 9—9 of Fig. 8, Fig. 10 is a transverse section of the conduit illustrating a variation of the invention, Fig. 11 is a bottom plan view of the structure shown in Fig. 10, Fig. 12 is an enlarged bottom plan view of the contact clip shown in Fig. 10, Fig. 13 is a detail section on the line 13—13 of Fig. 12, Fig. 14 is a detail plan view of a contact clip.

The conduit is formed of sheet metal and provided in sections, preferably of uniform length, which are connected so as to form a conduit of such length as is needed to meet any given conditions. The sheet metal body of the conduit is indicated at 1 in the accompanying drawings and it will be noted that it is preferably of a rectangular cross section and may have one side open. The conduit may be provided with brackets or lugs 2 at intervals upon its top or a side to facilitate securing of the same to a wall or ceiling or other fixed support and at intervals it may be provided with hand holes over which are secured covers 3 whereby access may be had to the interior of the conduit, when necessary, to inspect, repair or assemble the elements contained therein. Referring to Fig. 2, for instance, it will be noted that the conduit contains a lining 4 of insulation which extends across its closed side or back and down its opposite sides so that the entire casing will be prevented from making electrical contact with the conducting elements. One edge of the open side of the conduit is constructed with a reentrant flange 5 fitting around the edge of the side member of the lining so that the lining will be firmly supported, and, at the opposite side, brackets 6 are provided in which the edge of the lining seats for the same purpose. There is also secured in the conduit, along its closed side in any convenient manner, a block or inner lining 7 of insulation and upon this inner lining are formed barriers 8 which are in the form of ribs extending from end to end of the conduit sections and also of insulation, as clearly shown in Fig. 2, whereby the bus bars or conductor bars which extend longitudinally of the conduit will be separated and jumping of the current from one bar to an adjacent bar will be prevented. In the arrangement shown in Figs. 1 to 6, the bus bars are identified by the reference numeral 9 and it will be noted, upon reference to Fig. 1, that the ends of the bus bars project beyond the ends of the conduit sections so that they may overlap the ends of bus bars in meeting sections and be secured thereto to provide continuous paths for the electric current through the entire length of the conduit. The bus bars are flat sided bars of metal having good conducting qualities and they are suspended from the inner lining 7 by hangers 10 provided at intervals and secured to the inner lining 7, as shown at 11, and secured to one side of the respective bus bar by screws or bolts, as indicated at 12. At such intervals as may be deemed desirable or found to be convenient or necessary, contact clips 13 are provided and these contact clips are formed of sheet metal having a side member 14 disposed at one side of the bus bar and secured thereto by screws 15 inserted through said member into the bus bar, as will be readily understood. From the upper end of the side member 14, the metal of the clip is bent laterally, as shown at 16, to extend through a shallow notch or recess formed in the upper edge of the bus bar and integral with the end of this cross portion 16 are formed resilient jaws which may be engaged by the blades of a switch or the contact points of a plug in order that the current may be transferred to branch conductors. The blade-engaging jaws of the clip are resilient and their ends are spread or flared, as will be understood upon reference to Fig. 2, so that the switch blade or other engaging element may readily enter between the jaws to be firmly held thereby and make good electrical contact. It will be understood that one of the jaws of the clip bears directly against the bus bar so that it makes good electrical contact therewith and a part of the current will be diverted onto the engaged blade without sparking.

In Figs. 1 to 5 I have illustrated the conduit especially designed to accommodate a switch, it being noted that there are three bus bars and that the switch will have three blades 17 to engage the clips on the respective bus bars. A switch casing 18 is secured to or formed on the open side of the conduit casing and this switch casing may be provided with hand holes 19 over which doors or covers 20 are secured so that access may be had to the interior as desired. The lower edges of the barriers 8 and of the side linings of the conduit are constructed with notches 21 at intervals and the bottom of the switch casing is open at one side and provided along said side with an upturned flange 22 having notches 23 therein at intervals corresponding to the notches 21. At the closed side of the conduit, blocks 24 are provided, the blocks being provided in pairs with the members of the pairs spaced to aline with the notch 23 at the opposite side of the casing. The switch and the blowout fuses are mounted upon a base block 25 of porcelain or other insulation and, in the form shown in Figs. 1, 2 and 3, this base block comprises a vertical member 26 and a horizontal member 27 extending from the vertical member near the upper edge of the same. Through the vertical member, approximately in the plane of the underside of the horizontal member 27, are formed spaced openings 28 through which are inserted tongues 29 extending from the upper ends of plates 30 upon which are formed resilient clips 31 or blade-holding contacts, as will be understood upon reference to Figs. 1 and 3. The ends of the tongues 29 are secured to clips 32 each of which engages and supports one end of a blowout fuse 33, the opposite end of the fuse being supported by a similar clip 34 from which a tongue 35 extends along the underside of the member 27 of the base block. A set screw or binding post 36 is fitted through the tongue 35 so as to secure said tongue to the block and provide a fastening for the end of a conductor which may be carried out through the conduit to a point of use. Knock-outs, indicated at 37, and of the usual form, are provided in the conduit to facilitate the application of conductors and the connecting of the same to the fuses.

The switch blades 17 are flat blades of sheet metal of proper dimensions to engage frictionally within the clips 31 and 13 and intermediate their ends lateral plates or tongues 38 are secured to the blades, as shown. The offset portion 39 of a crank shaft is engaged through the lateral plates or tongues 38 and this shaft is journaled or pivotally supported at its ends in brackets 40 secured on the vertical member of the base block, as will be understood, one end of the shaft being equipped with a handle 41 whereby it may be rocked when necessary. When the switch is to be assembled with the conduit, the switch blades and the operating shaft are mounted on the base block, the fuses are also mounted on the base block and the block is then slid sidewise through the open side of the switch casing with the upper and lower edges of the member 26 passing through the notches 21 and 23, as will be understood. The door or cover 42 of the switch casing is then swung down into the position shown in Fig. 2 so that the operating parts will be covered and the device thus closed against the entrance of dust and other matter which might interfere with the successful transmission of current. The vertical member 26 of the base block is held in its proper position by its engagement with the notches 21 and 23 and by having its inner lower corner engaged between the guide blocks 24, as will be understood.

The form of the invention illustrated in Figs. 4 and 5 is the same as that shown in Figs. 1 and 2 and previously described, except that the base block 43 is a single plate of insulation and the switch elements are mounted upon one side of the plate and the fuses 44 are mounted upon the opposite side of the plate and disposed in a vertical position, the horizontal branch 27, shown in Fig. 3, being omitted. Otherwise, the construction is the same as has been described and the operation is identical.

In Fig. 7 is shown a conduit casing 45 having a lining 46 of insulation and having one side open to be covered by a switch casing 47. There is also an inner lining 48 having insulating barriers 49 extending longitudinally thereof, but in this arrangement the bus bars 50 are disposed against the inner lining 48 and are secured thereto by rivets or bolts, the bus bars presenting sides instead of edges to the lining and being supported directly against the lining. Contact clips 51 are secured at intervals to the respective bus bars and these contact clips are constructed of sheet metal each having a top plate 52 through which fastening screws are inserted into the respective bus bar so that the top plate will be held in intimate contact with the bus bar to make good electrical connection therewith. From the side edges of the top plate, the metal of the clip is extended downwardly to define side plates 53 and the lower edges of these side plates are carried inwardly and then upwardly to form the parallel jaws 54. The clips are resilient so that the jaws will be held frictionally against the switch blade or other element which may be inserted between them and they are extended slightly beyond the area of the respective side plates to form guide tongues 55 which diverge, as shown most clearly in Fig. 8, whereby a switch blade or a plug terminal will be readily guided into proper engagement with the jaws 54. The round bends 56 between the jaws and the side plates will also serve as guides to blades which may be inserted directly upward. At the end of the clip opposite the diverging tongues 55, one jaw is provided with a laterally extending tongue 57 which projects across the space between the jaws and thereby serves as a stop to prevent a blade swinging past the jaws and thereby failing to make the proper electrical connection. The switch casing 47 has an open side through which the base block carrying the switch and fuses may be inserted and this open side is covered by a door 58, as will be understood.

In Fig. 10 the conduit is of the same form as shown in Fig. 7, except that the extension forming a switch casing is not employed. A cover 59 of insulating material is secured across the open side of the conduit and this cover has formed on its inner side barriers 60 which extend up to the inner lining 61 and seat in grooves 62 formed longitudinally in said inner lining. The bus bars 63 are secured against the inner lining 61 in the same manner as shown in Fig. 7 and to the bus bars are secured contact clips 64, while in the cover 59 longitudinal slots 65 are formed and so located that when the cover is in place the slots will be directly under the contact clips and plug terminals or other contact members inserted through the slots will be guided to and engaged with the clips.

The clips shown in Fig. 10 are illustrated in detail in Figs. 12 and 13 and it will be noted that they are of integral construction of sheet metal and each is formed with a top plate 66 which is secured by screws to the respective bus bar so that it will be held in firm positive electrical contact therewith. From the side edges of the top plate 66, the members of the clip are carried downwardly and then caused to converge, as shown at 67, to merge into the jaws 68 between which the plug terminals or other take-off elements are engaged. The lower ends of the jaws form diverging guide lips 69 and at one end of the clip the jaws are provided with diverging guide lips 70 while, at the opposite end, one of the jaws is formed with a laterally extending stop lip 71 corresponding to the stop lip 57, shown in Fig. 8.

It will be noted that in all of the arrangements shown and described, the construction is simple and the parts are compactly arranged so that they may be very readily assembled. The conducting elements are all thoroughly housed in insulation so that the liability of sparks forming and damaging adjacent parts of the building or injuring operators who may be near the conduit is minimized and practically eliminated. The switch blades are so mounted that they may be withdrawn from the contact clips or engaged therewith without arcing and will, whenever engaged, make good electrical connections so that current may be safely diverted.

While the conduit shown in Figures 1, 2, 4, 5 and 7 is especially constructed for use with the switches shown in Figures 1 to 5, inclusive, it is obvious that a wide variety of switches and plugs might be inserted through the open side of the conduit and engage with the bus bars. This is especially true of the structure shown in Figures 4 and 5 where the switch casing 18 is of greater area than the switch casing shown in Figures 1 and 2.

Having thus described the invention, I claim:—

1. In apparatus for the purpose set forth, a conduit, insulated bus bars therein, contact clips on the bus bars, a switch casing mounted on the conduit at one side of the same, a block of insulation fitted in the switch casing, a switch mounted on one side of said block and having blades adapted to engage the contact clips on the bus bars, and fuses mounted on the base block and electrically connected with the respective switch blades.

2. In apparatus for the purpose set forth, a conduit, electrical conductors extending longitudinally of the conduit, a switch casing mounted on one side of the conduit and having an open side, the opposed edges of the conduit and the switch casing being provided with notches therein at intervals, a base block of insulation insertable endwise through the open side of the switch casing to engage in said notches and be held thereby, and a switch mounted on said base block and arranged to electrically engage the conducting elements in the conduit.

3. In apparatus for the purpose set forth, a conduit, an insulation lining in the conduit, conductors extending longitudinally through the conduit, barriers of insulation in the conduit parallel with and between the conductors, said barriers and the edges of the conduit and the insulation lining having notches therein, a switch casing on one side of the conduit having an open side and provided along said open side with an inwardly extending flange having notches therein at intervals corresponding to the notches in the lining and the barriers, spaced guide blocks at the opposite side of the switch casing, a base block of insulation insertable through the open side of the switch casing with its upper and lower edges engaging said notches, and switch elements mounted on said block and adapted to engage the conductors in the conduit.

4. Apparatus for the purpose set forth comprising a conduit, electrical conductors extending longitudinally through the conduit, a lining of insulation in the conduit, barriers of insulation extending longitudinally of the conduit parallel with and between the conductors, a switch casing on one side of the conduit, a base block of insulation insertable endwise through the switch casing and comprising a vertical plate and a horizontal plate extending from the vertical plate near the upper edge thereof, a switch mechanism mounted upon one side of the vertical plate and arranged to electrically engage the conductors in the conduit, and fuses mounted on the horizontal plate and electrically connected with the switch mechanism.

MARTIN J. DE MASK. [L. S.]